United States Patent Office 2,812,981
Patented Nov. 12, 1957

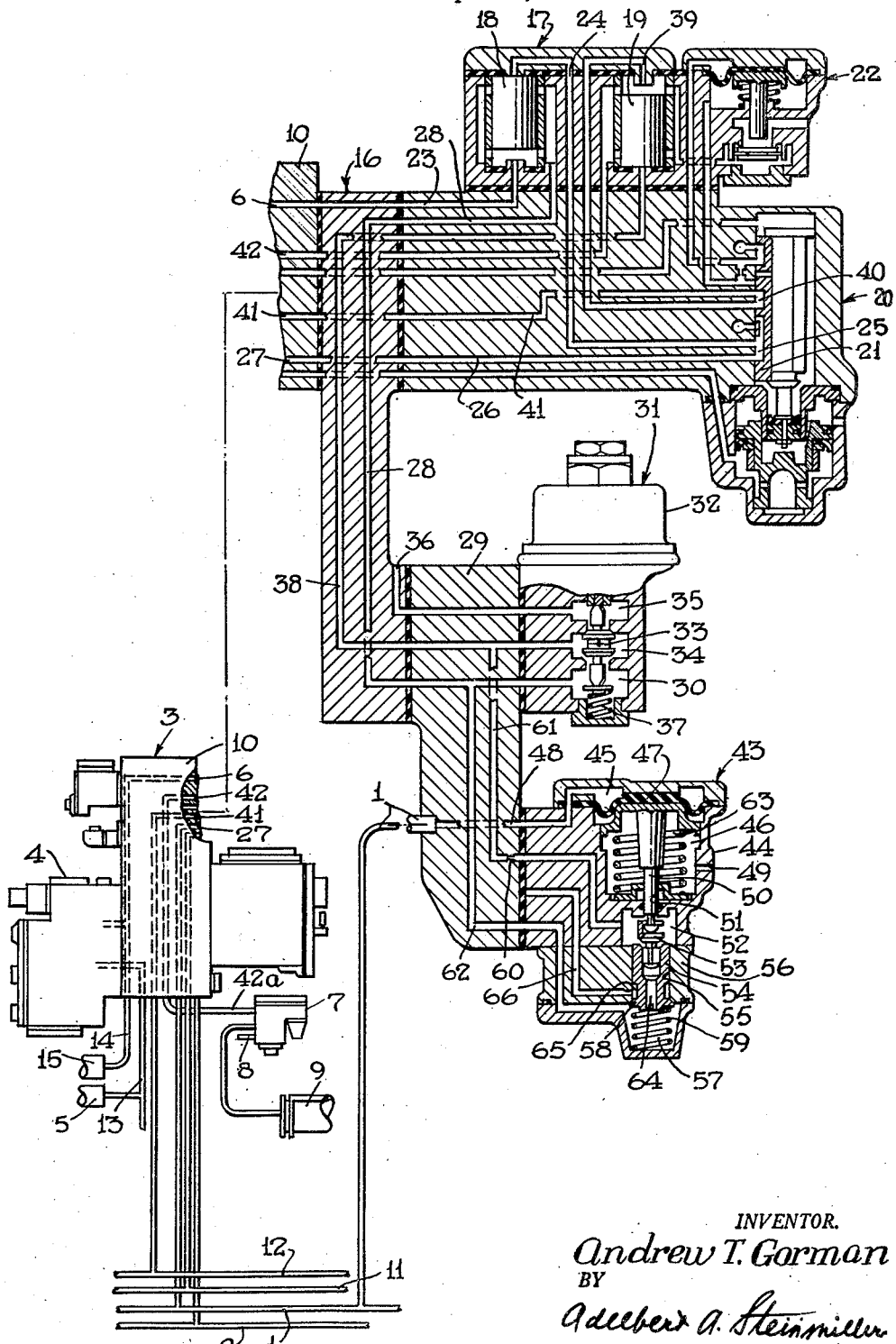

2,812,981

FLUID PRESSURE AND DYNAMIC BRAKE INTERLOCK APPARATUS

Andrew T. Gorman, Pitcairn, Pa., assignor to Westinghouse Air Brake Company, Wilmerding, Pa., a corporation of Pennsylvania Application September 15, 1953, Serial No. 380,307

6 Claims. (Cl. 303—3)

This invention relates to fluid pressure and dynamic brake apparatus and more particularly to the type adapted for use on railway locomotives of the electric or diesel-electric types.

In Westinghouse Air Brake Company's Instruction Leaflet No. 2606–1 dated February 1950, there is shown and described a No. 24–RL brake equipment adapted to control the brakes on an electric or diesel-electric locomotive and the cars of a connected train on either the usual automatic principle through the medium of a brake pipe or the electro-pneumatic straight-air principle through the medium of train wires and a straight-air pipe. This equipment comprises an engineer's automatic brake valve device provided on the locomotive for varying, selectively, the presssure of fluid in the brake pipe and in a control pipe, the pressure in the latter pipe controlling operation of a master controller which, in turn, controls energization and deenergization of application and release magnet valve devices for providing a pressure in the straight-air pipe corresponding to that in said control pipe. This equipment also comprises an engineer's independent brake valve device, also provided on the locomotive, for controlling the brakes thereon independently of those on the connected cars, in the well-known manner.

Since the driving motors on locomotives of the above types are adapted for operation as generators to effect dynamic braking, concurrent application on the locomotive of both the dynamic brakes and fluid pressure brakes is prevented by a dynamic brake interlock magnet valve device operative, upon cut-in of dynamic brakes, to close communication between a fluid pressure supply passage and a delivery passage through which the brakes on the locomotive are controlled on both the automatic and the straight-air principles and at the same time vent said delivery passage to atmosphere for releasing the fluid pressure brakes, in order to reduce the possibility of stalling of the locomotive and consequent sliding of the locomotive wheels.

If at the time the dynamic brakes are subsequently cut out of operation, the straight-air pipe is charged with fluid under pressure and the brakes on the cars of the train are, as a result, applied, the pressure of fluid in said pipe will automatically become effective to promptly reapply the locomotive brakes, whereas if the brakes on the cars are applied in response to a reduction in brake pipe pressure and the brake valve device is in a lap position (to be described subsequently), a reapplication of locomotive brakes will also automatically occur due to pressure of fluid bottled up in what is known as a displacement volume which is charged with fluid under pressure under this condition.

Where locomotives are engaged in freight service, fluid pressure braking is generally controlled on the automatic principle. Since freight trains are relatively long, an automatic reapplication of fluid pressure brakes on the locomotive upon cutout of the dynamic brakes on said locomotive might produce a violent stop and a serious slack run-in condition, especially if the train speed is relatively low at the time of such cutout, and it is therefore important to prevent such an automatic reapplication of brakes.

In order to avoid the difficulty, just described, a shunt communication, containing a choke, and by-passing the dynamic brake interlock magnet valve device has heretofore been provided between the aforementioned supply and delivery passages, for desirably permitting the displacement volume to be vented to atmosphere by way of the vented delivery passage while the dynamic brakes are cut in and the automatic fluid pressure brakes are applied to the connected cars. This shunt communication could also result in a condition which, while not serious, may be considered objectionable, viz, when the locomotive is engaged in passenger service, in which the fluid pressure brakes are generally controlled on the electro-pneumatic principle, a continuous leak, limited by the above-mentioned choke, of straight-air pipe pressure to atmosphere will occur whenever the dynamic brakes were effective on the locomotive concurrently with an electro-pneumatic brake application on the connected cars. Such leak could result in undesired movement of the master controller between its lap and application positions to maintain the straight-air pipe at the head of the train charged with fluid at the pressure corresponding to the position of the engineer's automatic brake valve device, and this, in turn, could produce a gradual build-up in pressure in the straight-air pipe in the rearward portion of a train where the effect of such leak may not be perceptible and consequently cause a gradual increasingly greater degree of braking of the cars toward the rear of the train over that being maintained on the cars toward the front of the train, and this, of course, would be undesirable.

The principal object of the invention is therefore the provision of improvements for use in the 24–RL locomotive brake equipment for eliminating the above difficulties.

According to this object, means are provided to vent the displacement volume to atmosphere, as heretofore proposed and for the above described reasons, when the dynamic brakes on the locomotive are effective concurrently with an automatic brake application on the connected cars of a train, for thereby preventing a reapplication of automatic fluid pressure brakes on said locomotive when said dynamic brakes are subsequently cut out of operation; but said means are rendered ineffective when said dynamic brakes are effective concurrently with an electro-pneumatic brake application on said cars in order to prevent loss of straight-air pipe pressure to atmosphere and thereby avoid the above described possible objection.

Other objects and advantages will become apparent from the following more detailed description of the invention.

In the accompanying drawing, the single figure is a diagrammatic view, mainly in section, of a portion of the No. 24–RL locomotive brake equipment embodying the invention.

*Description*

The structure embodying the invention is adapted for association with fluid pressure brake apparatus which may, for sake of illustration, be of the type shown and described in the Instruction Leaflet above referred to. The disclosure in the accompanying drawing and in the following description has therefore been limited to only such items as are essential to a clear understanding of the invention.

As shown in the drawing, the brake apparatus comprises the usual electro-pneumatic straight-air pipe 1 and the usual brake pipe 2, both of which are adapted to extend through a locomotive and cars of a train. An engineer's automatic brake valve device (not shown) is provided, which may be of the type designated in the aforementioned leaflet as a "DSE–24 Brake Valve" and having an adjustable shifter lever to adapt said device for controlling, selectively, the pressure of fluid in the straight-air pipe 1 and brake pipe 2; such control of pressure in the straight-air pipe 1 being effected by way of a straight-air control pipe (not shown), an electro-pneumatic master controller (not shown) and train wires controlling operation of application and release magnet valve devices (not shown), while pressure in the brake pipe 2 is controlled directly by the aforementioned engineer's brake valve device. When adjusted for electro-pneumatic operation, the brake valve device is movable to a running position for venting the straight-air pipe 1 to atmosphere and is movable from said running position into an application and release zone for charging said pipe with fluid at a pressure proportional to the extent of such movement. When adjusted for automative operation, the brake valve device is movable to a release position for charging the brake pipe 2 with fluid under pressure; to a service position for effecting any desired degree of service reduction in pressure in said pipe; and to a lap position for bottling up the fluid in said pipe at the desired reduced pressure.

A brake controlling valve device 3, provided on the locomotive, comprises a service portion 4 which is operative in response to a service reduction in pressure in the brake pipe 2 to supply fluid under pressure from an auxiliary reservoir 5 to a passage 6 and thence by way of a communication (to be described subsequently) to a brake cylinder relay valve device 7 for actuating same to supply fluid at a like pressure from a supply pipe 8 to a brake cylinder device 9 for applying the brakes on the locomotive. When, by such flow to the relay valve device 7, the pressure of fluid in the auxiliary reservoir 5 has been reduced to a degree slightly lower than that in the brake pipe 2, the service portion 4 will move to a lap position for preventing further flow and thereby limiting the pressure of fluid in said relay valve device according to the extent of reduction in brake pipe pressure. When the brake pipe 2 is subsequently recharged with fluid under pressure, through aforementioned actuation of the engineer's brake valve device, the service portion 4 of brake controlling valve device 3 will, in response to such recharging, assume a release position in which passage 6 is vented to atmosphere for thereby causing the relay valve device 7 to vent the brake cylinder device 9 and effect a release of the locomotive brakes.

The brake controlling valve device 3 comprises a bracket 10 having one face on which is mounted the service portion 4. Connected to the bracket 10 are the straight-air pipe 1, the brake pipe 2, an actuating pipe 11, an independent application and release pipe 12, and a pipe 13, which latter pipe is constantly open to the auxiliary reservoir 5 and to the aforementioned application and release magnet valve devices. A pipe 14, also connected on bracket 10, establishes constant fluid pressure communication between a branch of the passage 6 and a so-called displacement volume 15 comprising movable abutment means (not shown) biased in one direction by a spring but operable by pressure of fluid in passage 6 to move toward an opposite position. Mounted on another face of bracket 10 is a dynamic brake interlock valve device 16 on which, in turn, is mounted an independent application and release, or interlock, valve device 17.

The interlock valve device 17 comprises two double check valves 18, 19 and a selector valve device 20 comprising a slide valve 21 having a normal position, in which it is shown in the drawing, and in which the brakes on the locomotive are adapted to be controlled in unison with those on the connected cars of a train either by way of the straight-air pipe 1 or the brake pipe 2; said slide valve also having an independent position, not pertinent to the invention, in which an application of said locomotive brakes, effected in response to a variation in pressure in either the brake pipe 2 or straight-air pipe 1, is adapted to be released and which also provides by way of the independent application and release pipe 12 for control of the locomotive fluid pressure brakes independently of those on said cars. The device 17 further comprises a quick release valve device 22, the operation of which is also not pertinent to the invention.

The independent application and release pipe 12 is adapted for connection to an engineer's independent brake valve device (not shown) which is operative to supply fluid under pressure to and vent the same from said pipe for controlling application and release of the locomotive brakes independently of the straight-air pipe 1 and brake pipe 2, as will be later described.

The passage 6 in bracket 10 is open to one end of the double check valve 18 by way of a passage 23 extending through the devices 16, 17. Open to the opposite end of the double check valve 18 is one end of a passage 24 which extends through device 17 and is connected by way of a cavity 25 in slide valve 21, when in its normal position, to a passage 26 extending through devices 17, 16 into constant communication with a passage 27, which is provided in bracket 10 and constantly open to the straight-air pipe 1.

When, by previously described operation of the service portion 4 of brake controlling valve device 3, fluid under pressure is supplied to passage 6, such fluid will flow through pipe 14 to displacement volume 15 and will also flow through passage 23 to the lower end of double check valve 18 and shift said check valve to an upper position, in which it is shown in the drawing and in which it blanks off passage 24; whereupon such fluid will flow to a passage 28 which extends through devices 17, 16 and through a filling piece or bracket 29 to be described subsequently.

When fluid under pressure is supplied to the straight-air pipe 1, such fluid will flow through passages 27, 26, cavity 25 in slide valve 21, and passage 24 to the upper end of the double check valve 18 and shift said check valve into a lower position, in which it blanks off passage 23, such fluid then flowing via the passage 28 to a chamber 30 in a dynamic brake interlock magnet valve device 31 which constitutes a part of the dynamic brake interlock valve device 16; the bracket 29 comprising an upper portion which is interposed between the device 31 and the remaining portion of device 16, for reasons to be brought out presently.

The magnet valve device 31 comprises a magnet 32 which is adapted to be energized when the dynamic brakes on the locomotive are cut into operation and deenergized when said brakes are not in operation. The magnet 32 is arranged to control operation of a double seating valve 33 contained in a chamber 34. When energized, the magnet 32 is adapted to cause seating of valve 33 in a lower position so as to close communication between the chambers 30 and 34 and open chamber 34 to a chamber 35 which is constantly open to atmosphere by way of a passage 36. Upon deenergization of the magnet 32, a spring 37 acting indirectly on valve 33 is adapted to seat said valve in an upper position, in which it is shown in the drawing, so as to terminate fluid pressure communication between chambers 34 and 35 and open chamber 34 to chamber 30.

The chamber 34 is connected by way of a passage 38 extending through bracket 29 and devices 16, 17 to the lower end of double check valve 19. Open to the opposite end of the double check valve 19 is a passage 39 which extends through device 17 and is open by way of a cavity 40 in slide valve 21, when in its normal position, to a passage 41 which extends through devices 17, 16 and bracket 10 of device 3 to the independent application and release pipe 12. The double check valve 19 controls fluid pressure communication of the passages 39 and 38, selectively, with a passage 42 which extends through devices 17, 16 and bracket 10 to a pipe 42a connected to the relay valve device 7 for controlling operation of the latter device according to pressure of fluid in said passage 42.

The structure thus far described is operative in exactly the same manner as that described in the aforementioned leaflet. It will be noted that if either passage 6 is supplied with fluid under pressure by operation of the brake controlling valve device 3 in response to a reduction in brake pipe pressure, or passage 27 is charged with fluid under pressure from the straight-air pipe 1, such fluid will flow through previously described communication to chamber 30 of magnet valve device 31.

According to the invention, the bracket 29 and also a pneumatic cut-off valve device 43 are added to the structure described in the aforementioned leaflet, which device 43 may, for sake of illustration, be of the type designated in said leaflet as an "H–5–A Relayair Valve" and used in other portions of the 24–RL brake equipment not referred to herein. The device 43 is mounted on a depending portion of the bracket 29 and comprises, briefly, a casing 44 having a control chamber 45 separated from a non-pressure chamber 46 by a movable abutment 47, comprising such as a diaphragm and follower. The control chamber 45 is chargeable with fluid under pressure or ventable to atmosphere by way of a passage 48 in bracket 29, which passage is in constant communication with a branch of the straight-air pipe 1; and the non-pressure chamber 46 is constantly open to atmosphere by way of a port 49 in casing 44. A rod 50, depending from the movable abutment 47, extends through the non-pressure chamber 46 and projects, in sealing, slidably guided engagement with the wall of an aligned bore 51 in casing 44, into a chamber 52. A valve 53 disposed in chamber 52 is attached to the projecting end of rod 50 and is adapted to be carried by said rod into engagement with a suitable seat formed on one end of a plunger 54, which has slidably guided engagement with the wall of an aligned bore 55 extending through a partition 56 in casing 44 separating chamber 52 from a chamber 57. At the opposite end of plunger 54 is an integrally formed valve 58 disposed in chamber 57 and urged by a spring 59 into engagement with a suitable seat provided in partition 56 in encirclement of bore 55.

A passage 61 in bracket 29, containing a choke 60, connects chamber 52 and passage 38, for reasons to be explained presently. A passage 62 in bracket 29 connects chamber 57 and passage 28.

When the straight-air pipe 1 is vented to atmosphere, a spring 63 disposed in non-pressure chamber 46 of cut-off valve device 43 urges the movable abutment 47 into one position, in which it is shown in the drawing, and in which position the valve 53 is held unseated by rod 50, while valve 58 is seated by action of spring 59, for thereby establishing a fluid pressure communication between chambers 57 and 52 by way of an opening 64 extending axially through the plunger 54. When the straight-air pipe 1 is pressurized, however, the movable abutment 47 will assume, against resistance of spring 63, an opposite position in which valve 53 is seated against plunger 54 and the rod 50 through such seating engagement holds said plunger in an advanced position in which the valve 58 is unseated against resistance of spring 59, for thereby closing off chamber 52 from chamber 57 and connecting the latter chamber, by way of an annular chamber 65 encircling plunger 54, to a passage 66 which is blanked off where the device 43 is mounted on bracket 29.

*Operation*

In operation, assume initially that the service portion 4 of brake controlling valve device 3 is operating in response to a reduction in pressure in brake pipe 2, as previously described, to supply fluid under pressure to passage 6 for effecting an automatic application of the fluid pressure brakes on the locomotive concurrently with those on the connected cars, while the dynamic brakes on the locomotive are cut out of operation.

Under these conditions, fluid under pressure will flow from passage 6 through pipe 14 to the displacement volume 15 and such fluid will also flow from passage 6 to passage 23, shifting double check valve 18 to its upper position, and then flow via passage 28 to chamber 30 of magnet valve device 31. Since, with the dynamic brakes cut out, the valve 33 will be in its upper position, as previously described, fluid under pressure will flow from chamber 30 to chamber 34 and thence to passage 38, shifting double check valve 19 into its upper position, and then flow by way of passage 42 to the relay valve device 7 for actuating same to effect an application of the locomotive brakes.

Since the straight-air pipe 1 is always vented to atmosphere when the engineer's brake valve device is adjusted to provide for operation of the fluid pressure brakes on the automatic principle, the movable abutment 47 of the cut-off valve device 43 will be in its previously described one position in which chamber 52 is open to chamber 57. Hence the passages 28 and 38 will also be connected by way of a fluid pressure shunt communication defined by the passage 62, chamber 57 in device 43, opening 64 in plunger 54, unseated valve 53, chamber 52 and passage 61 containing the choke 60. Thus, under the assumed conditions, this fluid pressure shunt connection between passage 28 and 38 will be of no consequence, since said passages are already connected by way of the magnet valve device 31.

Assume now, that with an automatic fluid pressure brake application in effect on the locomotive and connected cars, in the manner above described, the dynamic brakes on the locomotive are cut into operation.

The consequent energization of magnet 32 of magnet valve device 31 will cause valve 33 to assume its lower position, in which chamber 34 is closed off from chamber 30 but is opened to chamber 35, as previously described. In such position of valve 33, the fluid pressure brakes on the locomotive will be promptly released because the relay valve device 7 will be vented to atmosphere by way of passages 42, 38, chambers 34, 35 and vent passage 36; and this fluid pressure vent communication will be maintained as long as the dynamic brakes are cut in, for thereby preventing a fluid pressure brake application on the locomotive.

In the structure shown in the aforementioned leaflet, fluid under pressure remained bottled up in the displacement volume 15 and chamber 30 of magnet valve device 31 and in the intervening fluid pressure communication, and such fluid was promptly effective, upon cutout of the dynamic brakes on the locomotive, to effect a reapplication of the automatic fluid pressure brakes thereon.

In this improved structure, however, while the dynamic brakes are applied, fluid under pressure in the displacement volume 15 is vented to atmosphere by way of the previously defined fluid pressure shunt communication between passage 28 and the now vented passage 38; the choke 60 in said shunt communication retarding the venting of fluid under pressure from said displacement volume to atmosphere relative to the venting of fluid under pressure from the relay valve device 7 in order to assure prompt operation of said relay valve device to release the fluid pressure brakes on the locomotive. With the displacement volume 15 thus vented on the locomotive whenever an automatic application of brakes is in effect on the connected cars of a train concurrently with cut-in of the dynamic brakes on the locomotive, an undesired automatic reapplication of automatic fluid pressure brakes on the locomotive will be prevented upon subsequent cutout of the dynamic brakes.

Assume now, that with the dynamic and fluid pressure brakes on the locomotive and connected cars released, the engineer actuates the aforementioned automatic brake valve device for charging the straight-air pipe 1 with fluid under pressure, in the manner previously described, for effecting an electro-pneumatic application of the brakes on the locomotive and connected cars.

Under these conditions, fluid under pressure will flow from the straight-air pipe 1 to the control chamber 45 of the cut-off valve device 43 causing the movable abutment 47 to move into its opposite position in which valve 53 is seated for closing off chamber 52 from chamber 57, while valve 58 is unseated and connects chamber 57 to the blanked-off passage 66, as previously described in detail.

Fluid under pressure will also flow from the straight-air pipe 1 through passages 27, 26 and the cavity 25 in slide valve 21 to passage 24, shifting the double check valve 18 to its lower position, and then flow through passage 28 to chamber 30 of magnet valve device 31. Since with the dynamic brakes cut out the valve 33 will be in its upper position, fluid under pressure will flow to relay valve device 7 and effect an application of the locomotive brakes, in the manner already explained. Fluid under pressure will also flow, however, from passage 28 through passage 62 to chamber 57, thence past unseated valve 58, to the blanked-off passage 66; and fluid under pressure will also bleed back from passage 38 through the choke 60 in passage 61 into the chamber 52 where it will be stopped by the seated valve 53. Thus this charging of passages 62 and 61 with fluid under pressure will be of no consequence.

If the dynamic brakes on the locomotive are now cut into operation, the magnet valve device 31 will operate to vent the relay valve device 7 to atmosphere in the manner previously described in detail. It will be noted, however, that passages 28 and 38 will be disconnected from each other not only by the valve 33 in magnet valve device 31 but also by way of the cut-off valve device 43, since the movable abutment 47 will be maintained in its opposite position by pressure of fluid in the charged straight-air pipe 1 and hence in control chamber 45. Consequently, no continuous leak of straight-air pipe pressure to atmosphere will occur with the improved structure.

With the improved structure, as in the structure described in the aforementioned leaflet, the engineer by operation of the aforementioned independent brake valve device may supply fluid under pressure to or vent the same from the independent application and release pipe 12 for thereby applying or releasing, respectively, the brakes on the locomotive at any time when they are not applied by operation of the service portion 4 of brake controlling valve device 3 or by fluid under pressure in the straight-air pipe 1, as will now be described. Thus, when pipe 12 is charged with fluid under pressure, such fluid will flow from pipe 12, through passage 41 and cavity 40 to passage 39 where it will shift the double check valve 19 into its lower position in which passage 38 will be blanked off, and then flow through passage 42 to the relay valve device 7 for actuating same to effect an application of the locomotive brakes, it being noted that operation of the magnet valve device 31 and pneumatic cut-off valve device 43 has no effect upon this application. Release of this independent brake application can be accomplished by venting the pipe 12, as will be understood from the foregoing.

Summary

It will now be seen that the improved structure prevents an undesired reapplication of the automatic fluid pressure brakes on the locomotive, if the dynamic brakes on said locomotive are cut out of operation at a time when an automatic fluid pressure brake application is in effect on the connected cars of a train; and also, said structure prevents any leakage loss of straight-air pipe pressure to atmosphere when the dynamic brakes on the locomotive are effective concurrently with an electro-pneumatic application of the brakes on said connected cars.

Having now described my invention, what I claim as new and desire to secure by Letters Patent, is:

1. A fluid pressure brake apparatus of the type comprising a brake pipe, brake controlling valve means operative in response to a reduction in pressure in said brake pipe to charge a first conduit with fluid under pressure, a straight-air pipe in open communication with a second conduit, a supply communication, a double check valve operative to charge said supply communication with fluid under pressure in response to pressure of fluid in said first and second conduits, selectively, a delivery communication, means operable by pressure of fluid in said delivery communication for effecting a brake application, a dynamic brake magnet valve device comprising valve means controlled by deenergization and energization of said magnet device and operative when in one position to establish a fluid pressure connection between said supply and delivery communications and when in an opposite position to disestablish said connection and vent said delivery communication to atmosphere for effecting a brake release, in combination with valve means controlled by pressure of fluid in said straight-air pipe and operative when said straight-air pipe is devoid of fluid under pressure to establish a fluid pressure shunt connection between said supply and delivery communications independently of said magnet valve device and operative to disestablish such shunt connection when said straight-air pipe is charged with fluid under pressure.

2. A fluid pressure brake apparatus of the type comprising a supply communication, a double check valve for controlling fluid pressure connection of a first opening and a second opening, selectively, with said supply communication, a brake pipe, a brake controlling valve device operative upon a reduction in pressure of fluid in said brake pipe to supply fluid under pressure to said first opening, a straight-air pipe chargeable with fluid under pressure and connected to said second opening, a delivery communication, means operable by fluid under pressure for effecting a brake application or brake release according to whether said delivery communication is charged with fluid under pressure or vented, respectively, and a dynamic brake magnet valve device operative upon deenergization to connect said supply and delivery communications and upon energization to disconnect the same and vent said delivery communication to atmosphere, in combination with a cut-off valve device having a first chamber connected to said supply communication, a second chamber connected to said delivery communication, and also having a control chamber connected to said straight-air pipe, said cut-off valve device being operative when said straight-air pipe is devoid of fluid under pressure to establish a fluid pressure shunt communication between said supply and delivery communications by way of said first and second chambers independently of said magnet valve device and operative when said straight-air pipe is charged with fluid under pressure to terminate said shunt communication.

3. The combination according to claim 2, including choke means interposed between said second chamber and said delivery communication for restricting rate of fluid flow by way of said shunt communication.

4. A fluid pressure brake apparatus of the type comprising a brake pipe, a straight air pipe, a first conduit adapted to be charged with fluid under pressure upon a reduction in pressure of fluid in said brake pipe, a second conduit open to said straight air pipe, a certain fluid pressure communication, first valve means for opening said first conduit and second conduit, selectively, to said certain communication according to whichever one of said conduits is charged with fluid under pressure and closing the other of said conduits to said certain communication, another fluid pressure communication, means operable by pressure of fluid in said other communication for effecting an application of brakes, a dynamic brake controlled device comprising second valve means operative when dynamic brakes are cut out to connect said certain communication to said other communication for controlling brakes according to pressure of fluid in said certain communication and operative when dynamic brakes are cut to disconnect said certain communication from said other communication and open said other communication to atmosphere for releasing brakes irrespective of the condition of pressure in said certain communication, in combination with third valve means responsive to release of fluid under pressure from said straight air pipe to establish a fluid pressure shunt communication for opening said certain communication to said other communication in by-pass of said second valve means and responsive to supply of fluid under pressure to said straight air pipe to disestablish said shunt communication.

5. The combination according to claim 4, including means for restricting the rate of flow of fluid under pressure through said shunt communication.

6. In a fluid pressure brake apparatus, the combination of a straight air pipe, a brake pipe, means defining a fluid pressure delivery communication, means operable by pressure of fluid in said delivery communication for effecting an application of fluid pressure brakes and responsive to release of fluid pressure from said delivery communication for effecting a release of fluid pressure brakes, means defining a supply communication, a brake controlling valve device responsive to a reduction in brake pipe pressure to supply fluid under pressure to said supply communication and responsive to a subsequent increase in brake pipe pressure to release fluid under pressure from said supply communication, a dynamic brake controlled device comprising first valve means operative when dynamic brakes are cut out to connect said supply communication with said delivery communication for controlling brakes according to pressure of fluid in said supply communication and operative when dynamic brakes are cut in to disconnect said supply communication from said delivery communication and open said delivery communication to atmosphere for releasing fluid pressure brakes, and second valve means responsive to venting of the straight air pipe to open said supply communication to said delivery communication in by-pass of said first valve means for enabling release of fluid under pressure from said supply communication by way of said delivery communication in event of cut-in of dynamic brakes at a time when said supply communication is charged with fluid under pressure and responsive to charging of the straight air pipe with fluid under pressure to close such by-pass connection between said supply communication and said delivery communication.

References Cited in the file of this patent

UNITED STATES PATENTS

| | | |
|---|---|---|
| 2,587,051 | Lewis | Feb. 26, 1952 |
| 2,667,385 | Erson et al. | Jan. 26, 1954 |